United States Patent [19]
Danby et al.

[11] Patent Number: 5,829,934
[45] Date of Patent: Nov. 3, 1998

[54] PREVAILING TORQUE CLIP FOR THIN WALL PANEL

[75] Inventors: Michael R. Danby, Stoney Creek, Canada; Todd H. Christian, Akron, Ohio; Hans R. Rattmann, Burlington, Canada

[73] Assignee: Eaton Corporation, Cleveland, Ohio

[21] Appl. No.: 978,769

[22] Filed: Nov. 26, 1997

[51] Int. Cl.[6] .............................. F16B 13/07; F16B 19/00
[52] U.S. Cl. ........................... 411/182; 411/173; 411/508
[58] Field of Search ..................................... 411/173, 174, 411/175, 182, 508, 509, 510, 913

[56] References Cited

U.S. PATENT DOCUMENTS

| | | | |
|---|---|---|---|
| 2,707,013 | 4/1955 | Flora et al. | 411/173 |
| 4,300,865 | 11/1981 | Murray | 411/175 X |
| 4,595,325 | 6/1986 | Moran et al. | 411/173 |
| 4,610,588 | 9/1986 | Van Buren, Jr. et al. | 411/173 |

Primary Examiner—Neill R. Wilson
Attorney, Agent, or Firm—Daniel S. Kalka; Alberet E. Chrow

[57] ABSTRACT

A prevailing torque clip (100) is provided that has a head portion (4) having a frusto-conical projection (10) having an aperture (6) therethrough that is provided preferably with diametrical opposed helical thread forms (8) and (8') that are operative to threadingly engage threads of a threaded member rotationally advanced therethrough. Head portion 4 includes a pair of ressilient arms (12) and (12') that end in respective free-ends (9) and (9') that are operative to engage the threads of the threaded member and cooperate with thread forms (8) and (8') to prevent loosening thereof. Clip (100) is adapted to prevent rattle when used to secure an object to thin wall panel by being provided with at least one pair of tabs (16) and (16') that are operative to elevate clip (100) from a panel to which it is being secured sufficiently to ensure that the portion of arms (12) and (12') that are in close proximity to projection (10) are positioned within the panel opening into which arms (12) and (12') are received.

3 Claims, 1 Drawing Sheet

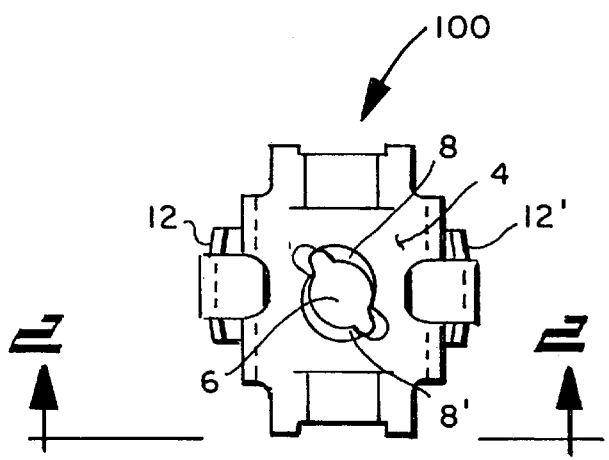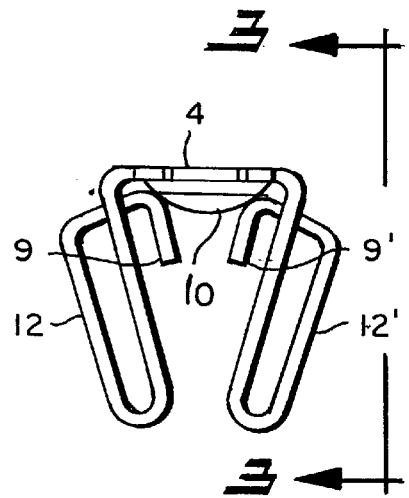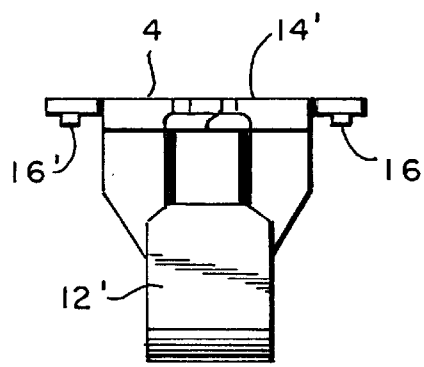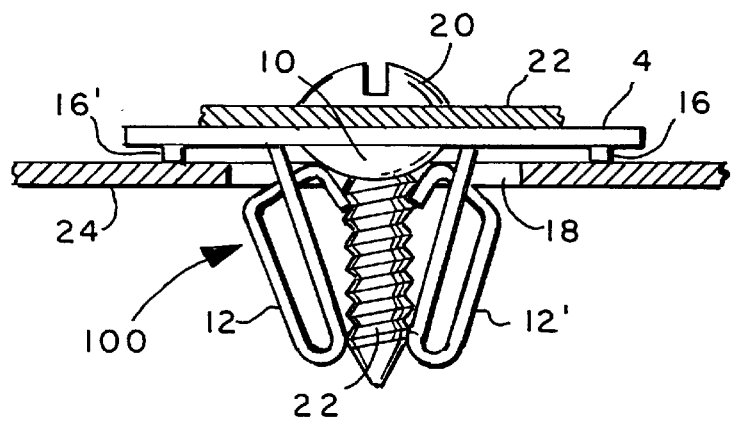

PREVAILING TORQUE CLIP FOR THIN WALL PANEL

INTRODUCTION

This invention relates generally to a clip for securing a member to thin wall paneling by a threaded fastener such as a screw and more particularly to a prevailing torque clip adapted to secure a member to thin wall paneling and ensure against rattle.

BACKGROUND OF THE INVENTION

Although prevailing torque fastening clips are well known, such as disclosed in U.S. Pat. Nos. 4,610,588 and 4,595,325 the latter of which is assigned to the assignee of the present invention and both of which are incorporated herein by reference, none have heretofore been particularly adapted to minimize or eliminate rattle when used to secure a member to thin wall panel.

As used herein, thin wall panel is defined as having a thickness range of from about 0.015 inch to about 0.050 inch and more commonly from about 0.020 inch to about 0.035 inch.

Prevailing torque fastening clips characteristically feature a pair of resilient arms having respective free-ends that engage opposite sides of a threaded fastener such as a screw rotationally advanced through a threaded aperture in the fastener to provide a torque thereagainst resisting loosening of the screw.

One of the problems however has been the tendency of such prior art type fastening clips to loosen and fail to secure the threaded fastener tightly enough to prevent rattle when securing a member to thin wall panel.

The prevailing torque clip of the present invention overcomes such prior art short comings and is able to prevent rattle by bringing a section of the resilient arms in dose proximity to a frusto-conical projection through which the threaded fastener is received in combination with at least one pair of tabs that are adapted to elevate a head portion of the clip from the panel sufficiently to bring the section of the arms in close proximity to the projection within an opening through the panel through which the arms are received and preferably in combination with a pair of opposed helical thread forms disposed on opposite sides of an aperture through the projection that are adapted to threadingly engage the threads of the threaded fastener being rotationally advanced therethrough.

SUMMARY OF THE INVENTION

Accordingly, it is an object of this invention to provide a prevailing torque fastening clip.

It is another object of this invention to provide a prevailing torque fastening clip adapted to secure a member to a thin wall panel by means of a threaded fastener and is operative to minimize or prevent rattle while in secured relationship therewith.

BRIEF DESCRIPTION OF THE DRAWINGS

FIG. 1 is a top elevation view of an embodiment of the clip of the invention referenced by numeral 100;

FIG. 2 is a front elevation view of clip 100 taken along view line 2—2 in FIG. 1;

FIG. 3 is a side elevation view of clip 100 taken along view line 3—3 in FIG. 2; and FIG. 4 is a partially cross-sectional front elevation of clip 100 being used to secure a plate member 22 to a panel 24.

SUMMARY OF SOME PREFERRED EMBODIMENTS

In FIG. 1, clip 100 has a head portion 4 that is preferably substantially flat. Head portion 4 has an aperture 6 therethrough that is surrounded by a frusto-conical projection 10 shown in FIGS. 2 and 4.

Aperture 6 is surrounded by at least one helical thread form and preferably a pair of diametrically opposed helical thread forms referenced by numerals 8 and 8' in FIG. 1. Opposed helical thread forms 8 and 8' are preferred for they are able to threadingly engage the threads of a threaded member such as threads 22 of screw 20 shown in FIG. 4 at substantially the same axial location along screw 20 and thereby minimize cocking of the screw.

Head portion 4 has a pair of resilient arms 12 and 12' respectively disposed on opposite sides of aperture 6 that extend integrally therefrom angularly downwardly towards each other in facing relationship to frusto-conical projection 10 as shown in FIGS. 2 and 4 and thence curve outwardly away from each other and thence extend angularly away from each other in a direction upwardly towards the side of head portion 4 facing towards arms 12 and 12' and thence curve angularly inwardly towards each other and respectively extend through respective windows in arms 12 and 12' of which one window is referenced by numeral 14' in FIG. 3.

Arms 12 and 12' then curve angularly towards each other in a direction away from the side of head portion 4 facing towards arms 12 and 12' in close proximity to frusto-conical projection 10 and end in respective free-ends 9 and 9' referenced in FIG. 2 that are respectively operative to engage the threads on opposite of a threaded member being rotationally advanced through aperture 6 and are shown doing such in engaging threads 22 of screw 20 in FIG. 2 but not referenced. The force exerted by free-ends 9 and 9' of resilient arms 12 and 12' cooperate with helical thread forms 8 and 8' to prevent screw 20 from loosening.

Clip 100 of the invention is particularly adapted to prevent rattle when used to secure an object to their wall panel by including at least one pair of tabs respectively disposed on opposite sides of aperture 4 such as tabs 16 and 16' shown in FIGS. 3 and 4 that respectively extend away from the side of head portion 4 facing towards arms 12 and 12' and, as shown in FIG. 4, are operative to elevate clip 100 above the side of panel 24 facing towards member 22 sufficiently to ensure that the location of which arms 12 and 12' are in close proximity to frusto-conical projection 10 are positioned within the panel opening such as opening 18 shown in FIG. 4.

Although the clip of the invention may be made from any suitably resilient plastic, metal or composite material, it has been found particularly advantageous to make the clip from a suitably resilient sheet metal having a thickness of about 0.025 inch.

What is claimed is:

1. A prevailing torque clip for thin wall panel, said clip comprising:

a head portion having a frusto-conical projection formed therein and having a pair of resilient arms respectfully extending integrally away from opposite sides thereof in facing relationship to each other on opposite sides of the projection and adapted to be received through an opening through the paneling, an aperture through the projection surrounded by at least one helical thread form adapted to threadingly receive a threaded fastener from a side of the head portion facing away from the arms, said arms extending away from the head portion in a direction towards each other and thence curving away from each other and upwardly toward the head portion and thence curving towards each other and extending through respective windows in the arms and thence curving downwardly towards each other in close proximity to the projection and ending in free-ends respective adapted to engage the threads on opposite sides of the threaded fastener upon rotational advancement through the projection, and said head portion having at least one pair of tabs respectively extending away from the side of the head portion facing towards the arms on opposite sides of the projection that are adapted to engage the side of the panel facing away from the arms on opposite sides of the panel opening and elevate the head portion therefrom for a distance sufficient to ensure that the portion of the arms in close proximity to the projection are positioned within the panel opening.

2. The clip of claim 1 wherein the tabs are disposed in substantial orthogonal relationship to the arms.

3. The clip of claim 1 having two of the helical thread forms substantially diametrically opposed to each other on opposite side of the aperture.

* * * * *